United States Patent [19]

Imaizumi et al.

[11] Patent Number: 5,987,175
[45] Date of Patent: *Nov. 16, 1999

[54] IMAGE FORMING APPARATUS AND METHOD BASED ON REDUCTION IMAGES AND ENCODING

[75] Inventors: Shoji Imaizumi, Shinshiro; Shigeru Moriya; Takayuki Nabeshima, both of Toyokawa, all of Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/648,834

[22] Filed: May 16, 1996

[30] Foreign Application Priority Data

May 18, 1995 [JP] Japan ................................. 7-119588

[51] Int. Cl.$^6$ .............................. G06K 9/36; G06K 9/32; H04N 1/393; G06F 15/00
[52] U.S. Cl. ......................... 382/232; 382/298; 358/451; 395/102
[58] Field of Search .................................... 382/298, 232, 382/301, 299, 276, 302; 358/452, 428, 451, 433, 261.1, 261.3; 348/581, 561; 395/102, 128; 345/128

[56] References Cited

U.S. PATENT DOCUMENTS

| 4,979,031 | 12/1990 | Tsuboi et al. | 358/75 |
| 5,097,518 | 3/1992 | Scott et al. | 382/298 |
| 5,119,182 | 6/1992 | Tsuboi et al. | 358/75 |
| 5,361,147 | 11/1994 | Katayama et al. | 358/532 |
| 5,495,539 | 2/1996 | Sieverding | 382/276 |
| 5,576,845 | 11/1996 | Komatsu | 358/433 |

FOREIGN PATENT DOCUMENTS

| 4-144485A | 5/1992 | Japan | H04N 1/413 |
| 4-145765A | 5/1992 | Japan | H04N 1/393 |
| 4-157975A | 5/1992 | Japan | H04N 1/387 |
| 4-220076A | 8/1992 | Japan | H04N 1/387 |
| 4-236568A | 8/1992 | Japan | H04N 1/387 |

*Primary Examiner*—Thomas D. Lee
*Assistant Examiner*—Wenpeng Chen
*Attorney, Agent, or Firm*—Burns, Doane, Swecker & Mathis, LLP

[57] ABSTRACT

An image forming apparatus includes an encode process unit for: (a) allocating image data of an original document into blocks containing a predetermined pixel matrix, and (b) determining from the image data in each block a mean value information and a gradient range exponent for each block; a series copy data generating unit for generating reduction image data for a plurality of reduction images by using the mean value information for each of the blocks as image data for the reduction images so that each pixel of the reduction images corresponds to a respective one of the plurality of blocks of the original document image data; and an image forming unit for forming images based on the reduction image data generated by the series copy data generating unit.

36 Claims, 11 Drawing Sheets

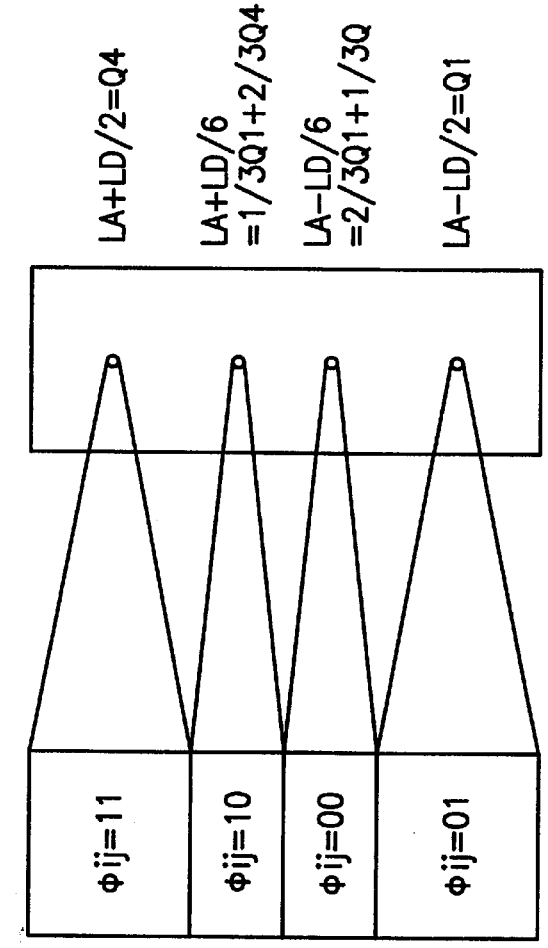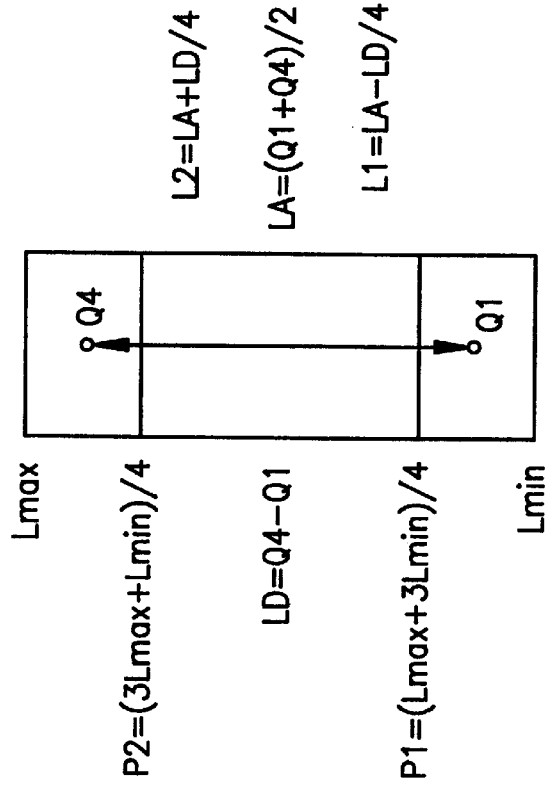

| 1 Frame<br><br>Reference | 2 Frame<br><br>R<br>Mean Value<br>Information LA<br><br>+10 | 3 Frame<br><br>G<br>Mean Value<br>Information LA<br><br>+10 | 4 Frame<br><br>B<br>Mean Value<br>Information LA<br><br>+10 |
|---|---|---|---|
| 5 Frame<br><br>RGB<br>Mean Value<br>Information LA<br><br>+20 | 6 Frame<br><br>RGB<br>Mean Value<br>Information LA<br><br>+10 | 7 Frame<br><br>RGB<br>Mean Value<br>Information LA<br><br>−10 | 8 Frame<br><br>RGB<br>Mean Value<br>Information LA<br><br>−20 |
| 9 Frame<br><br>RGB<br>Gradient Range<br>Exponent LD<br><br>X2.0 | 10 Frame<br><br>RGB<br>Gradient Range<br>Exponent LD<br><br>X1.5 | 11 Frame<br><br>RGB<br>Gradient Range<br>Exponent LD<br><br>X0.8 | 12 Frame<br><br>RGB<br>Gradient Range<br>Exponent LD<br><br>X0.5 |
| 13 Frame<br><br>Reference | 14 Frame<br><br>R<br>Mean Value<br>Information LA<br><br>−10 | 15 Frame<br><br>G<br>Mean Value<br>Information LA<br><br>−10 | 16 Frame<br><br>B<br>Mean Value<br>Information LA<br><br>−10 |

FIG. 10

IMAGE FORMING APPARATUS AND METHOD BASED ON REDUCTION IMAGES AND ENCODING

BACKGROUND OF THE INVENTION

1. Field of the Invention

The present invention relates to an image processing device and method for compression encoding of image information, and in particular, using a generalized block truncation coding (GBTC) method.

2. Description of the Related Art

In recent years the GBTC method has been proposed as a method for compressing and expanding document image data. The GBTC method executes processing to allocate image data of a document into blocks having a predetermined number of pixels, and compresses each block. Specifically, the pixel data within each block are quantized at a lower gradient level using gradient range exponent LD and mean value information LA calculated from the image data within each block. That is, the image data are converted to code data øij obtained by quantization, with the result that the data quantity is compressed. Mean value information LA equally divides the sum of mean value Q1 of image data less than parameter P1 determined by image data within the block, and mean value Q4 of image data greater than parameter P1 (where P1<P2). Gradient range exponent LD is the difference between mean value Q4 and mean value Q1.

FIG. 1 illustrates the flow of the coding process using a typical GBTC method. First, the image data of the document image are divided into blocks of 4×4 pixels, as shown in FIG. 1(a). Then the image data of each allocated block are extracted, and the image data of each extracted block are subjected to an encoding process using the GBTC method. Each image data has a data quantity of 1 byte (1 byte=8 bits=256 halftones). In the encoding process using the GBTC method, data of 16-pixel blocks (i.e., 1×16 bytes=128 bits) within the allocated block are encoded (compressed) in 4-bytes of code data, 1-byte gradient range exponent LD, and 1-byte mean value information LA, as shown in FIG. 1(b). The 4-bytes of code data are obtained by sorting and allocating the data of each pixel in 4-levels (quantizing). That is, 2-bit code data become 4-bytes in the 16-pixel block.

As a result, the image data (16 bytes) within a single block are encoded as 6-byte (48-bit) data. That is, the quantity of data of an image is compressed to 3/8.

FIG. 1(c) shows the data quantity of coded image data corresponding to a 6-pixel block of image data before encoding. Decoding of the encoded data is executed by calculating the image data (1 byte) corresponding to each code data (2 bits) based on the gradient range exponent LD and mean value information LA.

The image data of the 16 pixels Xij (i.e., i,j=1, 2, 3, 4) within the 4×4-pixel block are replaced by the four types of data (1 byte) among the 256 halftones via the decoding process. The decoded data contain obvious errors when compared to the data of the original document image. These errors are difficult to discern, however, due to the limitations of human visual acuity. That is, there is virtually no discernable loss of image quality in normal images.

Parameters Q1 and Q4 can be determined from the gradient range exponent LD and mean value information LA contained in the coded data. That is, a text image comprising a black color portion below parameter P1 and white color portion above parameter P2 can be reproduced from the coded data.

In the JPEG (Joint Photographic Experts Group) method of Huffman coding of data obtained by DCT (discrete cosine transform) conversion of image data, the data compression rate varies depending on the type of document. That is, although the JPEG method may realize a higher rate of data compression than the GBTC method on a particular document, the JPEG method may not be capable of any compression of another document. Thus, it is difficult to set the capacity of installed memory in image forming apparatuses using the JPEG method. On the other hand, the GBTC method is capable of compressing data at a normally constant compression rate. Therefore, image forming apparatuses using the GBTC method are advantageous in that the capacity of installed memory can be readily set.

Digital full color copying machines are often provided with a reduction series copying function for a plurality of image formations on a single sheet. When forming a plurality of reduced images, image information subjected to a reduction process is output a plurality of times in a main scan direction. Furthermore, when forming a plurality of reduced images, magnification is changed by changing the scanning speed in a subscan direction, and repeating a plurality of image forming processes on the same sheet.

In copying machines provided with a reduction series copy function, an image quality monitoring function is provided to monitor the quality of the image actually formed on paper by changing the various image forming conditions relative to a plurality of images formed on a single sheet. Copying machines provided with this image quality monitoring function execute, in addition to processing related to reduction series copying, other processing for switching the gamma table for each output of reduced image output of a single screen.

In the execution of the aforesaid reduction series copy function and image quality monitoring function, a mechanism for executing electrical variable magnification in the main scan direction and a function for outputting image data a plurality of times in the main scan direction must be provided. It is further necessary to provide a mechanism for controlling the scanning speed for processing in the subscan direction, and a separate control mechanism for the plurality of executions of the image forming process for a single sheet. When executing repeated image forming processes for the same sheet, the images formed on the sheet cannot be fixed until all image forming processes have ended. Therefore, variations in image quality may occur among the initially formed images and the last formed images on the sheet. Furthermore, problems arise in accelerated deterioration of the apparatus due to the repeated image forming processes on the single sheet.

OBJECTS AND SUMMARY

An object of the present invention is to eliminate the previously described disadvantages.

Another object of the present invention is to provide an image forming apparatus realizing reduction series copying and image quality monitoring functions having excellent efficiency.

Still another object of the present invention is to provide an image forming apparatus realizing highly efficient reduction series copying and image quality monitoring functions by executing an encoding process using the GBTC method.

Yet another object of the present invention is to provide an image forming apparatus realizing reduction series copying and image quality monitoring functions providing excellent image quality.

These and other objects are attained by an image forming apparatus comprising an encode process unit for allocating image data of a document into blocks containing a predetermined pixel matrix, determining mean value information and a gradient range exponent from image data contained in each block, and quantizing data of each pixel within the block as a gradient level less than the original image data based on the mean value information and gradient range exponent; a series copy data generating unit for generating image data of a plurality of reduction images using the mean value information obtained by the encode process unit as image data of each pixel comprising the reduction image, and an image forming means for forming images on paper sheets based on image data generated in the series copy data generating unit.

The aforesaid objects are further attained by an image forming apparatus comprising a calculation unit for allocating image data of a document in blocks of a predetermined pixel matrix and calculating the mean value information and gradient range exponent from the image data contained in each block, encode process unit for quantizing data of each pixel within a block as a gradient level less than the original image data based on the mean value information and gradient range exponent, memory unit for storing the man value information of each block, data generating unit for reading the mean value information of each block from the memory unit and generating image data of a plurality of reduction images as image data of each pixel comprising a reduction image of an original document from the read mean value information, control unit for outputting data generated by the data generating unit to the encode process unit and executing a second encoding process on the data and storing the code data in the memory unit, decode process unit for decoding the code data based on the mean value information and gradient range exponent of the second encoding process stored in the memory unit, and an image forming means for forming an image from the plurality of reduction images on a paper sheet based on image data obtained by the decoding process.

The aforesaid objects are further attained by providing a color balance changing means for rewriting the values of the mean value information and gradient range exponent of each block obtained by the second decoding process and stored in the memory unit for the predetermined value of each block of each reduction image.

In this instance, the encode process unit decodes the code data based on the mean value information and gradient range exponent of each block rewritten by the color balance means.

BRIEF DESCRIPTION OF THE DRAWINGS

These and other objects and features of the present invention will become apparent from the following description of the preferred embodiments thereof taken in conjunction with the accompanying drawings, in which:

FIGS. 2(a), 2(b), and 2(c) illustrate the GBTC method encoding process;

FIG. 10 illustrates the contents of the mean value information LA and gradient range exponent LD of each reduction image;

In the following description, like parts are designated by like reference numbers throughout the several drawings.

DETAILED DESCRIPTION OF THE PREFERRED EMBODIMENTS

A digital full color copying apparatus of the present invention executes a GBTC method encoding process on mean value information LA obtained by a GBTC method encoding process. Thus, image data reduced to $1/16$ can be readily obtained.

A preferred embodiment of the present invention is described hereinafter in the sequence below with reference to the accompanying drawings.

(1) GBTC method encoding/decoding processes
(2) Digital full color copying apparatus
(2-1) Construction
(2-2) Operation panel
(3) Image Processing
(3-1) Main routine
   (3-1-1) Mode setting process
   (3-1-2) Reduction series copy mode and image quality monitoring mode
      (3-1-2-1) Reduction series copy process
      (3-1-2-2) Image quality monitoring process
(1) GBTC Method Encoding/Decoding Processes The GBTC method allocates image data of a document into blocks having a predetermined number of pixels, and subjects the image data of each block to a compression process. Specifically, the data of each pixel within a block are quantized to fewer gradient levels using the mean value information LA and gradient range exponent LD calculated from the image data in each block. That is, the various image data are converted to code data $\phi ij$ obtained by quantization, with the result that the information quantity is compressed. Mean value information LA equally divides the sum of mean value Q1 of image data less than parameter P1 determined by image data within the block, and mean value Q4 of image data greater than parameter P1 (where P1<P2). Gradient range exponent LD is the difference between mean value Q4 and mean value Q1.

Figures 1A, 1B, 1C:
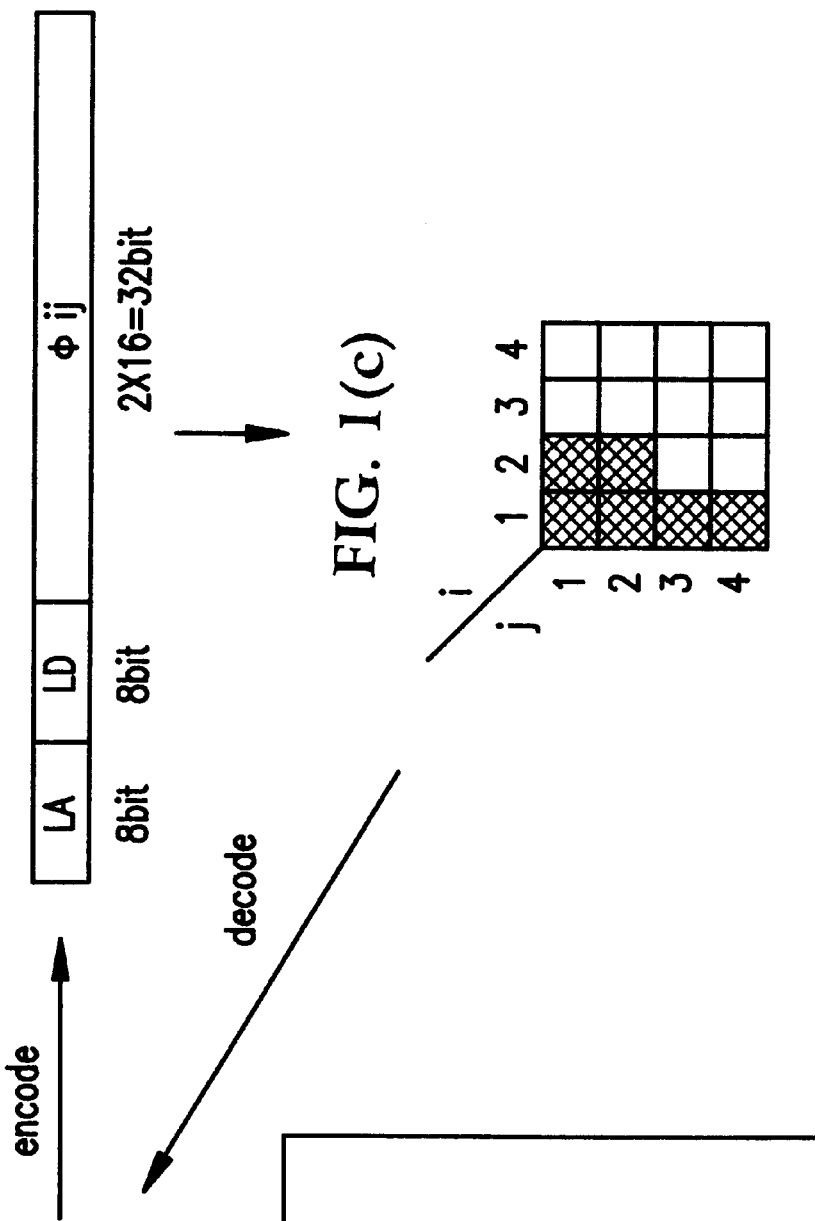
FIGS. 1(a), 1(b), and 1(c) illustrate the flow of the GBTC method encoding process.

FIG. 1 illustrates the general flow of the GBTC method encoding process. First, the image data of the document image are allocated in blocks of 4×4 pixels, as shown in FIG. 1(a). Then, image data are extracted from each allocated block, and the image data extracted from the block are subjected to a GBTC method encoding process. The image data have a data quantity of 1 byte for each pixel (1 byte=8 bits=256 halftones). In this GBTC method encoding process, 16-pixel block data (1×16 bytes=128 bits) within the aforesaid block are encoded (compressed) to a 1-byte gradient range exponent LD, a 1-byte mean value information LA, and 4-bytes of code data, as shown in FIG. 1(b). The 4-bytes of code data are obtained by converting the data of each pixel in 4-levels (quantizing) which can be represented by 2 bits. That is, 2-bit code data for each pixel become 4-bytes for the 16-pixel block.

As a result, the image data (16 bytes) within a single block are encoded as 6-byte (48-bit) data. That is, the quantity of data of an image is compressed to $3/8$.

FIG. 1(c) shows the data quantity of coded image data corresponding to a 6-pixel block of image data before encoding. Decoding of the encoded data is executed by calculating the image data (1 byte) corresponding to each code data (2 bits) based on the gradient range exponent LD and the mean value information LA.

In the present embodiment, document image data are extracted in block units of 4×4 pixels. The present invention is not limited to this arrangement, however, inasmuch as block units of other sizes, such as 3×3 pixels, or 6×6 pixels, may be extracted. Furthermore, the present invention is not limited to encoding the 256 halftone data of each pixel within a block as 4-level code data, inasmuch as the 256 halftone data may be encoded to other levels, such as 2-level, or 8-level, code data. The image forming apparatus of the present invention is characterized by executing various image forming processes based on discrimination of image attributes and discrimination results using the mean value information LA and gradient range exponent LD determined from parameters P1 and P2 determined from image data within each block, as described below.

FIGS. 2(a) through 2(c) illustrate the GBTC method encoding/decoding processes. FIG. 2(a) shows the relationships among the maximum image data Lmax within a block, minimum image data Lmin within a block, parameters P1 and P2, and gradient range exponent LD. A predetermined characteristics feature quantity required for encoding is determined from image data extracted in block units of 4×4 pixels. The feature quantity is determined by the following calculations. First, the maximum value Lmax and minimum value Lmin of the image data (8-bit) within a block are detected. Then, ¼ of the difference of the maximum value Lmax and minimum value Lmin is added to the minimum value Lmin to determine parameter P1, and ¾ of the difference is added to the minimum value Lmin to determine parameter P2. Parameters P1 and P2 are determined by Equation 1 and Equation 2 below.

P1=(Lmax+3 Lmin)/4      Eq.1

P2=(3 Lmax+Lmin)/4      Eq.2

Then, the mean value Q1 of the image data pixels less than parameter P1 is determined from the image data within the block. Mean value Q4 of the image data pixels greater than parameter P2 is determined from image data within the block. The weighted mean value information LA (LA=(Q1+Q4)/2) and the gradient range exponent LD (LD=Q4–Q1) are determined based on the previously determined mean values Q1 and Q4. Then, reference values L1 and L2 are determined by calculation using Equations 3 and 4.

L1=LA–LD/4      Eq.3

L2=LA+LD/4      Eq.4

The reference values L1 and L2 are used to render the mean value information LA and the 1-byte (8-bit) pixel data, i.e., the 256 halftone image data, as 2-bit image data, that is, to encode the data as 4-level code data.

Then, codes are allocated for all image data. FIG. 2(b) shows the value of code data øij allocated according to the image data of pixel Xij of column i (where i=1, 2, 3, 4) and line j (where j=1, 2, 3, 4) in the block. More specifically, the 2-bit code data øij is allocated in accordance with the value of pixel Xij as described below.

When Xij≦L1, øij=01
When L1<Xij≦LA, øij=00
When LA<Xij≦L2, øij=10
When L2<Xij, øij=11

The data encoded by the GBTC method comprises code data (16×2 bit) of the 16-pixel block, and the 1-byte (8-bit) data of the gradient range exponent LD and mean value information LA.

As shown in FIG. 2(c), when the code data are decoded, the aforesaid gradient range exponent LD and mean value information LA are used. That is, the data of Xij are substituted for the 256 halftone data as shown below in accordance with the code data øij allocated for pixel Xij.

When øij=01, Xij=LA–LD/2=Q1
When øij=00, Xij=LA–LD/6=2/3Q1+1/3Q4
When øij=10, Xij=LA+LD6=1/3Q1+2/3Q4
When øij=11, Xij=LA+LD/2=Q4

The image data of the 16 pixels of Xij within the 4×4 pixel block are substituted by the four types of data (1-byte) among the 256 halftones via the decoding process. The various decoded data include obvious errors when compared to the data of the original document image. These errors are difficult to discern, however, due to the limitations of human visual acuity. That is, there is virtually no discernable loss of image quality in normal images.

Parameters Q1 and Q4 can be determined from the gradient range exponent LD and mean value information LA contained in the coded data. That is, a text image comprising a black color portion below parameter P1 and white color portion above parameter P2 can be reproduced from the coded data.

In the JPEG (Joint Photographic Experts Group) method of Huffman coding of data obtained by DCT (discrete cosine transform) conversion of image data, the data compression rate varies depending on the type of document. That is, although the JPEG method may realize a higher rate of data compression than the GBTC method on a particular document, the JPEG method may not be capable of any compression of another document. Thus, it is difficult to set the capacity of installed memory in image forming apparatuses using the JPEG method. On the other hand, the GBTC method is capable of compressing data at a normally constant compression rate. Therefore, image forming apparatuses using the GBTC method are advantageous in that the capacity of installed memory can be readily set.

(2) Digital Full Color Copying Apparatus (2-1) Construction

Figure 3:
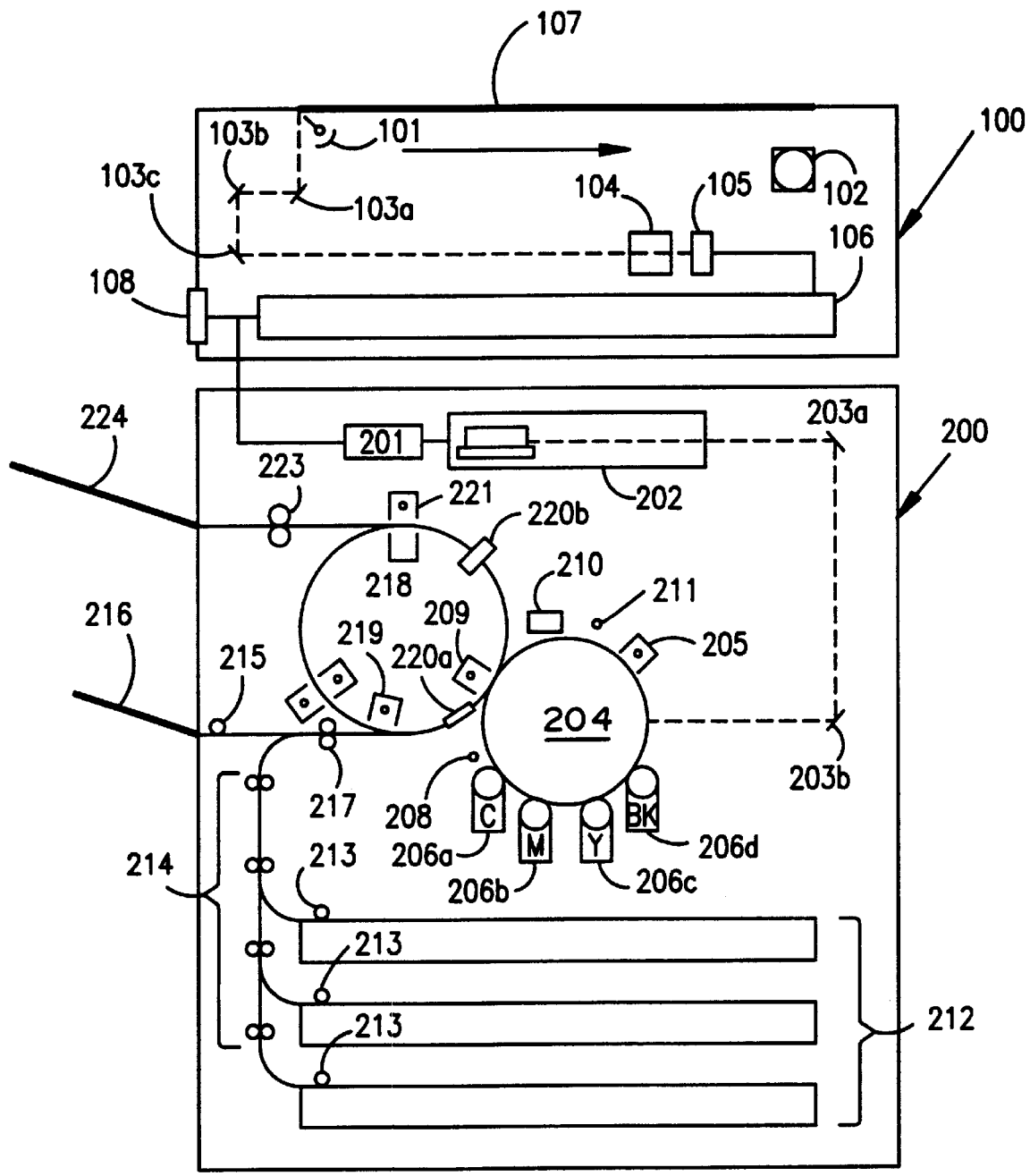
FIG. 3 is a section view showing the construction of a digital color copying machine.

FIG. 3 is a section view showing the construction of a digital full color copying apparatus. This digital full color copying apparatus is broadly divided into an image reading unit 100 for reading RGB image data of a document, and a copying unit 200.

In image reading unit 100, a document placed on glass document platen 107 is irradiated by an exposure lamp 101. The light reflected from the document is directed to a lens 104 by three mirrors 103*a*, 103*b*, and 103*c*, and forms an image on charge-coupled device (CCD) sensor 105. The exposure lap 101 and mirror 103*a* move in accordance with the set magnification at a speed V in the arrow direction (subscan direction) via a scanner motor 102. Thus, the document placed on the document platen is scanned across its entire surface. The mirrors 103*b* and 103*c* move in the arrow direction (subscan direction) at a speed V/2 in conjunction with the movement of exposure lamp 101 and mirror 103a in the same arrow direction. The multi-level electric signals of the three RGB colors obtained by CCD sensor 105 are converted to 8-bit halftone data by read signal processing unit 106. Thereafter, the converted image data are output to copy unit 200 via external output port 108.

In copy unit 200, image data correction unit 201 accomplishes halftone correction (gamma correction) of the input halftone data in accordance with the tone characteristics of the photosensitive member. Printer exposure unit 202 accomplishes digital-to-analog (D/A) conversion of the corrected image data, generates laser diode drive signals, and drives a semiconductor laser via the drive signals.

The laser beam emitted from printer exposure unit 202 in accordance with the image data irradiates the rotatably driven photosensitive drum 204 via reflecting mirrors 203a and 203b. Photosensitive drum 204 is irradiated by eraser lamp 211 before image exposure of each single copy, and is uniformly charged by charger 205. When the drum 204 is optically exposed in this state, an electrostatic latent image of the document is formed on the surface of photosensitive drum 204. Only one among the cyan (C), magenta (M), yellow (Y), and black (BK) toner developing devices 206a through 206d is selected, and develops the electrostatic latent image formed on the surface of photosensitive drum 204. After surplus charge is eliminated by eraser 208 prior to transfer, the developed toner image is transferred to a copy sheet wrapped around the transfer drum 218.

Transfer drum 218 has a transfer film on its surface, and rotates in a counterclockwise direction at the same speed as the rotation speed of the photosensitive member. A reference panel 220a is provided on the interior side of transfer drum 218 to synchronize the copy sheet home position and the image transfer position. Reference position sensor 220b generates a predetermined reference signal whenever reference panel 220a intersects the sensor 220b in accordance with the rotation of transfer drum 218. The copy sheet is fed from paper cassette units 212 to the transport path via take-up roller 213, and transported to timing roller 217 via feed roller 214. When a copy sheet is inserted in manual tray 216, it is fed to timing roller 217 via feed roller 215. Timing roller 217 supplies a copy sheet to transfer drum 218 synchronously with the aforesaid reference signal, and holds the copy sheet at a predetermined position on transfer drum 218. The copy sheet supplied to transfer drum 218 from timing roller 217 is electrostatically adhered to transfer drum 218 by charger 219.

The aforesaid printing process is repeated for the four colors yellow (Y), magenta (M), cyan (C), and black (BK). At this time, photosensitive drum 204, exposure lamp 101 in synchronization with the operation of transfer drum 218, and mirrors 103a, 103b, and 103c repeat predetermined operations.

Thereafter, the copy sheet is separated from transfer drum 218 by eliminating the charge electrostatically holding the copy sheet via a release charger pair 221. The copy sheet released from transfer drum 218 is subjected to a fixing process by a pair of fixing rollers 223, and is subsequently ejected to discharge tray 224.

Figure 4:
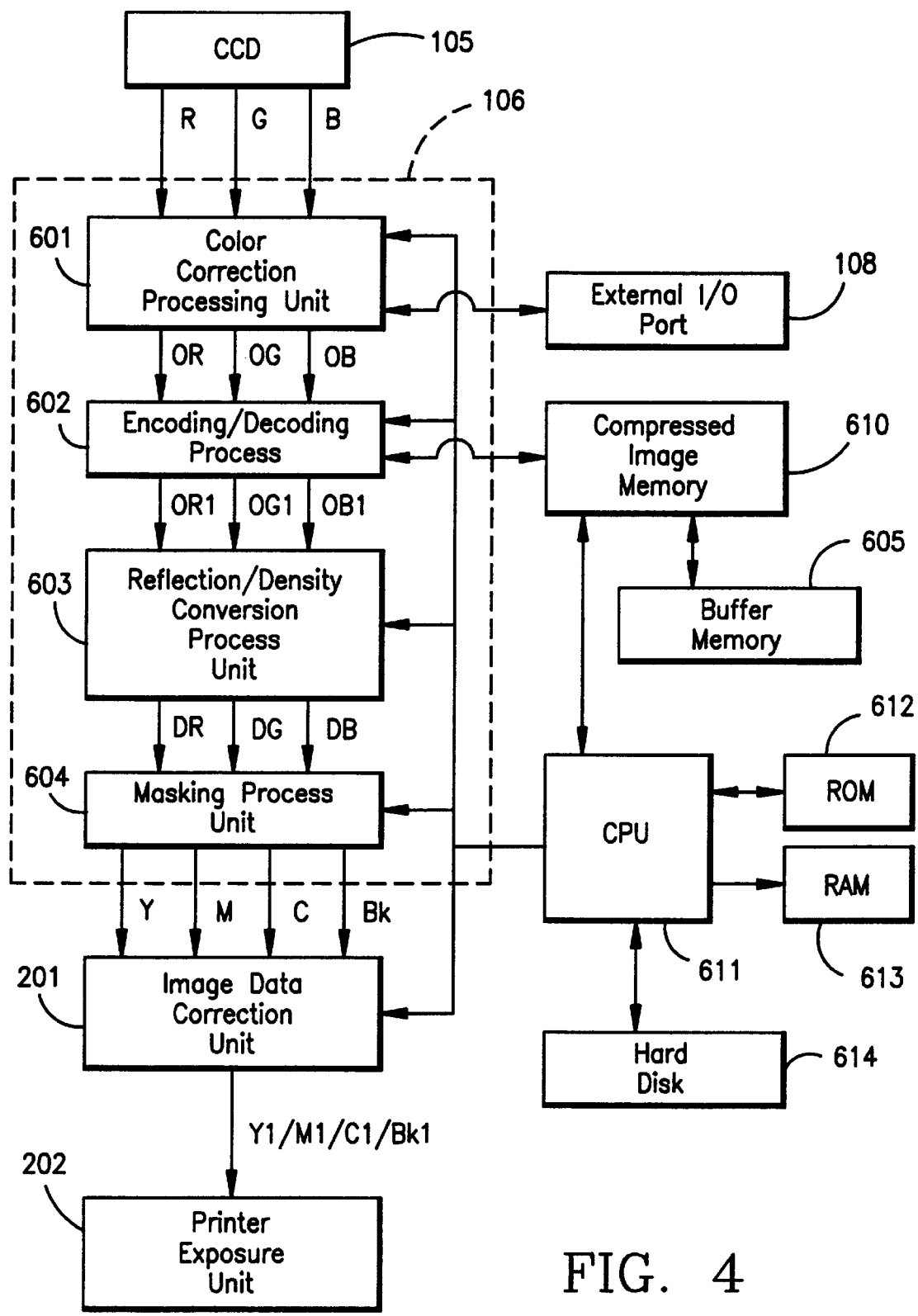
FIG. 4 is a block diagram showing the flow of the image forming process.

FIG. 4 is a block diagram showing the various signal processes executed by read signal processing unit 106. The various R, G, B image data of the document read by CCD sensor 105 have some dispersion due to solid state errors of CCD sensor 105. Thus, even when reading identical color table reference patterns, there are differences in the values of read data of each copying apparatus. In reading device color correction processing unit 601, the read RGB image data are corrected to standard RGB image data which are standardized by the National Television System Committee (NTSC) Standards, High Definition Television Standards (HDTV), or the like. In reading device color correction processing unit 601, the corrected image data OR, OG, OB are output to encoding/decoding process unit 602 as well as output to I/O port 108. The peripheral devices connected to the copying apparatus receive the OR, OG, OB image data of the document via external I/O port 108. Furthermore, this copying apparatus is capable of forming images using the OR, OG, OB image data input from a peripheral device via external I/O port 108. In such circumstances, the copying apparatus functions as a printer. This function is possible because the various processes of reading device color correction processing unit 601, are set to use standardized RGB image data.

In encoding/decoding process unit 602, the GBTC method encoding process is executed, and the reduction series copy process and image quality monitoring process are executed in accordance with the set mode. The GBTC method encoding process, reduction series copy process and image quality monitoring process are executed for the input OR, OG, and OB image data. The reduction series copy process and image quality monitoring process are described later. In the case of the decoding process, CPU 611 reads the coded data of each block from compressed image memory 610, executes the GBTC method decoding process, and outputs OR1, OG1, and OB1 image data.

Reflection/density conversion process unit 603 subjects the OR1, OG1, and OB1 image data to predetermined reflection/density conversion processing, and subsequently outputs DR, DG, and DB density data. The RGB image data which has been converted to density data are converted to one color image data among the color image data of cyan (C), magenta (M), yellow (Y), and black (BK) in masking process unit 604, and thereafter are output to image data correction unit 201. In image data correction unit 201, the image data output by the masking process unit 604 are subjected to a predetermined halftone correction (gamma correction) process, and thereafter the halftone data are output to printer exposure unit 202.

(2-2) Operation Panel

Figure 5:
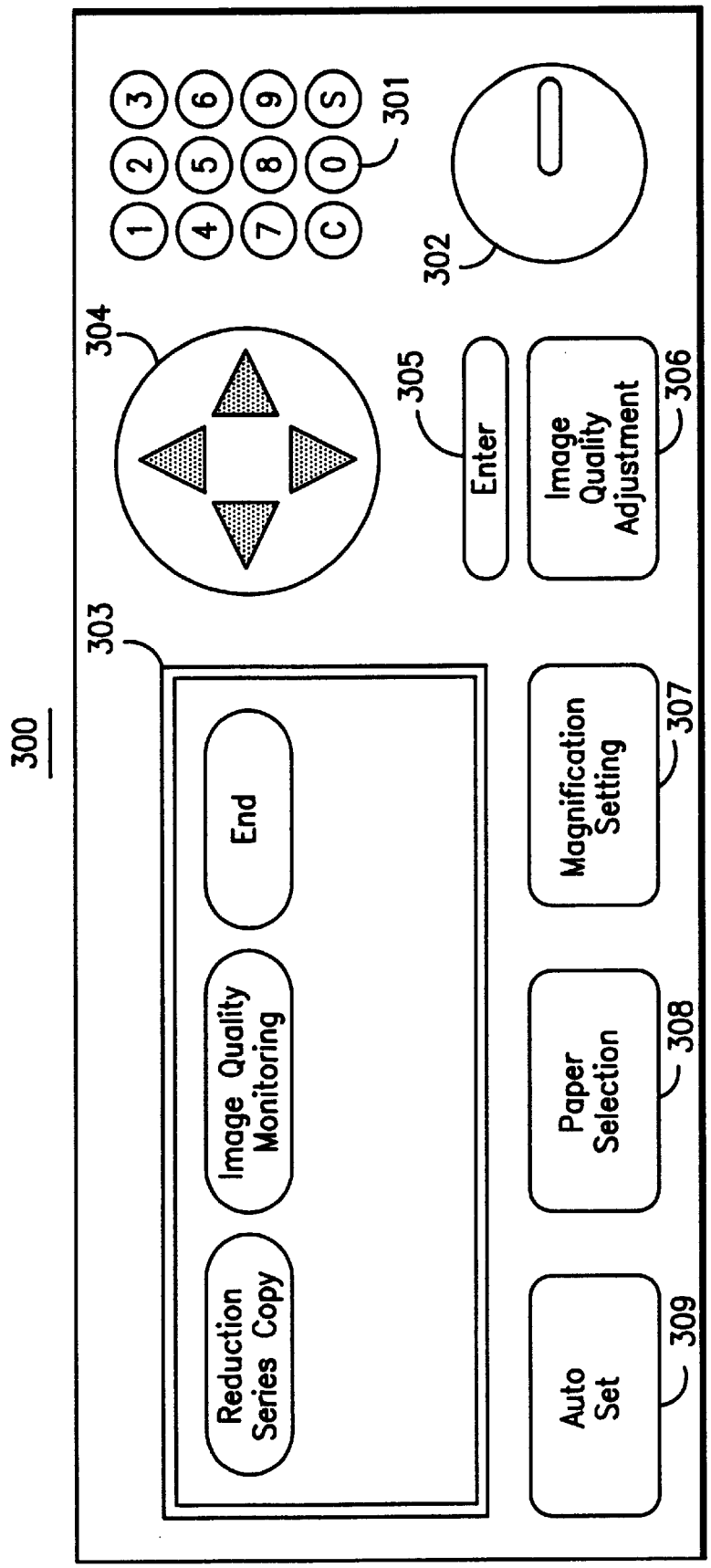
FIG. 5 is a front view of the operation panel of a digital full color copying machine.

FIG. 5 is a front view of the operation panel 300 of the digital full color copying apparatus. Operation panel 300 is provided with a ten-key pad 301 for entering the number of copies, start key 302 for starting the copy operation, display 303 for displaying the set mode and copy state, selection key 304 for selecting the mode displayed on display 303, enter key 305 for setting the mode displayed on display 303, image quality adjustment key 306 for selecting the reduction series copy mode and image quality monitoring mode, magnification setting key 307 for setting the copy magnification, paper selection key 308 for selecting the size of the copy sheet, and auto set key 309 for setting the automatic paper selection function.

If image edit key 306 is pressed, display 303 displays the mode setting screen shown in the drawing. The selection and setting items displayed on display 303 are accomplished in the manner described below. First, among the items displayed on display 303, the item to be selected is selected by pressing selection key 304, and the selected item is displayed in reverse video. Then, the enter key 305 is pressed to set the item. When the reduction series copy mode is selected, the value of flag S1 is set at [1]. When the image quality monitor mode is selected, the value of flag G is set at [1].

(3) Image Forming Process
(3-1) Main Routine

Figure 6:
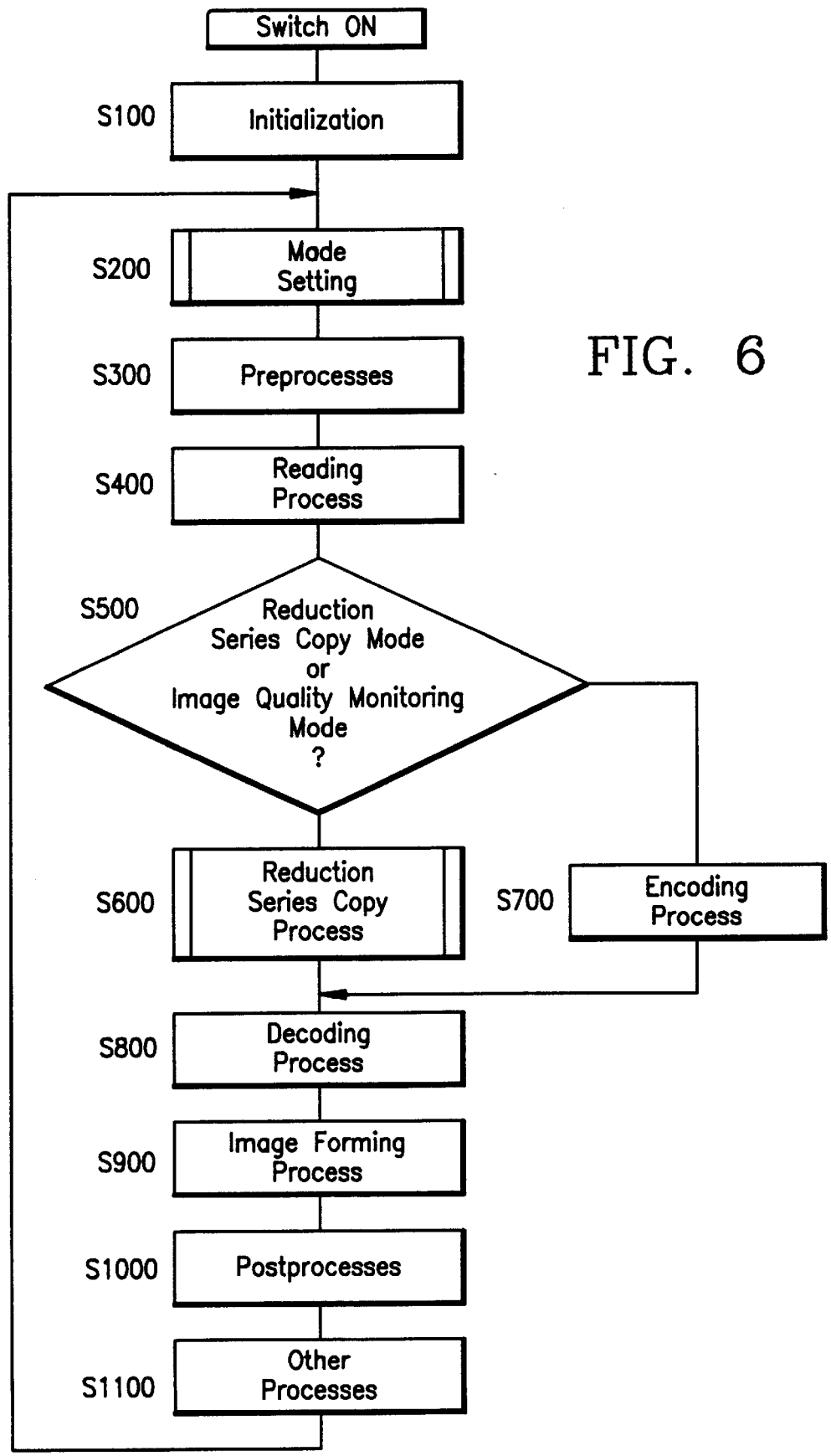
FIG. 6 shows the main routine of the copy operation.

FIG. 6 shows the main routine of the copy process executed by CPU 611 of the copying apparatus. First, the main unit of the copying apparatus is initialized (step S100). In this step, the value of flag S of the reduction series copy mode and the value of flag G of the image quality monitoring mode are set at [0]. Then, the mode setting process is executed from operation panel 300 (step S200). Next, various preprocesses such as the apparatus warm-up, shading, and image stabilization processes are executed (step S300). Thereafter, when start key 302 is pressed, CPU 611 actuates scanner motor 102 to read the RGB image data of the document placed on document platen 107 (step S400). Then, the values of flag S and flag G are checked to determine whether or not the reduction series copy mode or the image quality monitoring mode has been set by the user in the aforesaid mode setting process of step S200 (step S500). When the user has set the reduction series copy mode or the image quality monitoring mode (step S500: YES), the reduction series copy process is executed (step S600). If neither of the aforesaid modes has been set (step S500: NO), the GBTC method encoding process is executed, and the data (i.e., mean value information LA, gradient range exponent LD, code data øij) obtained for each block by the encoding process are stored in compressed image memory 610 (step S700).

After the processes of steps S600 and S700, the code data (mean value information LA, gradient range exponent LD, code data øij) stored in compressed image memory 610 are read out, and the GBTC method decoding process is executed (step S800). In the subsequent step S900, an image forming process is executed to form an image on a copy sheet based on the RGB image data obtained from the decoding process. After the image forming process, processing necessary for maintaining the condition of the apparatus is executed, e.g., those necessary processes which are not directly related to the image formation operation such as removal of residual toner from the surface of photosensitive drum 2094 after image formation and the like (step S1000). Finally, temperature control of the fixing device and communication control and the like are executed (step S1100).

(3-1-1) Mode Setting Process

Figure 7:
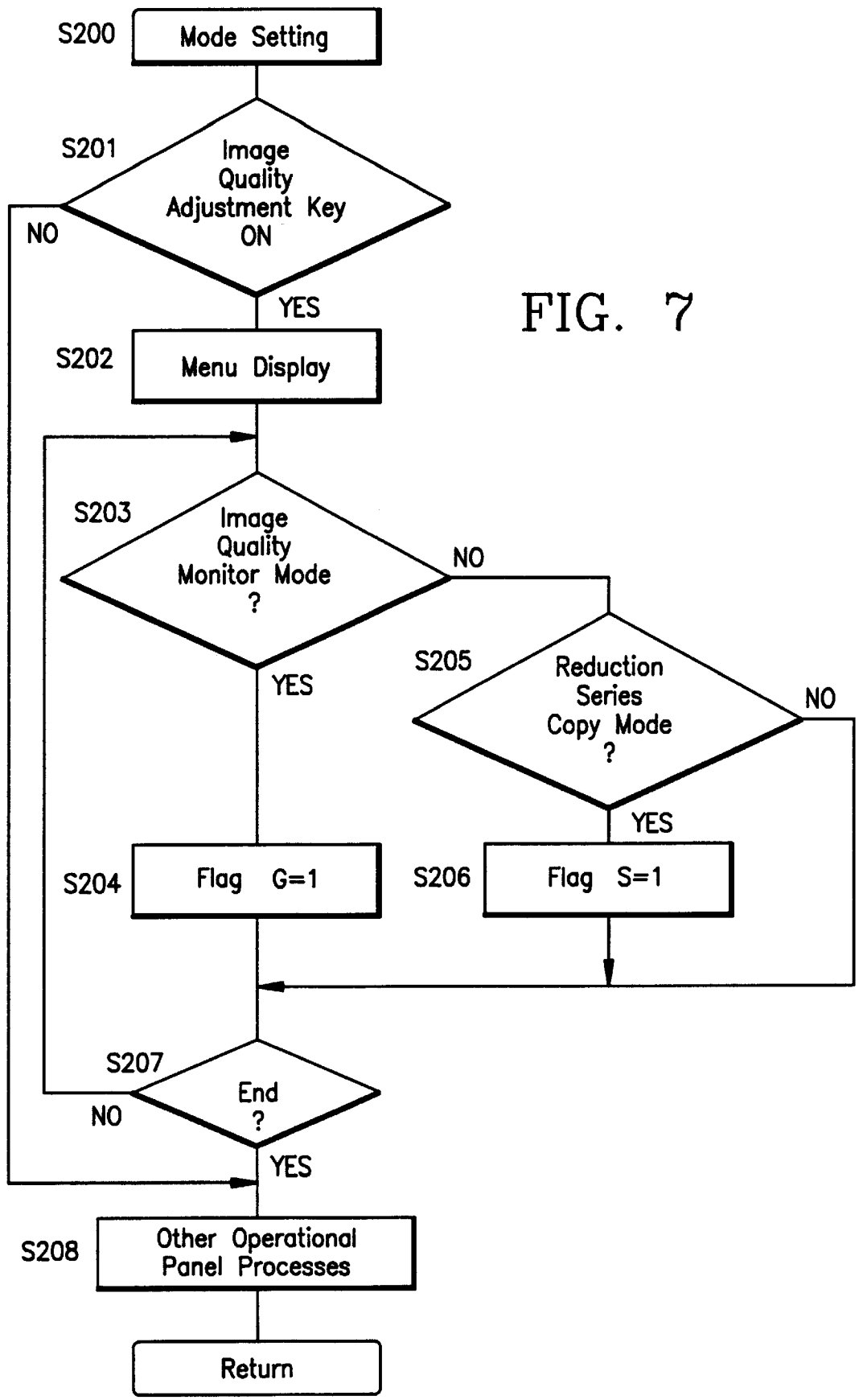
FIG. 7 is a flow chart of the mode setting process.

FIG. 7 is a flow chart of the mode setting process (step S200 in FIG. 6). When an operator presses the image quality adjustment key 306 on operation panel 300 (step S201: YES), the mode setting screen is displayed on display 303, as shown in FIG. 5 (step S202). When the enter key 305 is pressed following the selection of the image quality monitor mode item (step S203: YES), the value of flag G of the image quality monitor mode is set at [1] (step S204). When the enter key 305 is pressed following selection of the reduction series copy mode item (step 205: YES), the value of flag S of the reduction series copy mode is set at [1] (step S206). The image quality monitor mode or reduction series copy mode selection is awaited until the "end" screen item is selected or set (step S207: NO). When the enter key 305 is pressed following the selection of the "end" screen item (step S207: YES), the mode setting screen ends, and the routine returns after other operation panel processes have been executed (step S208).

(3-1-2) Reduction Series Copy Mode and Image Quality Monitor Mode

The value of the mean value information LA obtained for each block in the GBTC method encoding process is information relating to a mean value determined based on the value of the pixel data within each block. That is, the mean value of image data in each 4×4 pixel matrix is determined by extracting only the mean value information LA from each block and designating the mean value as the image data of the reduction image, and image processing is executed using the mean value as image data of the reduced image 1/16 the size of the original document image.

If reduction images are repeated a plurality of times in the main scan direction and subscan direction using the mean value information LA of each block as image data for each pixel, a plurality of reduced images can be printed on a single copy sheet. Furthermore, if the mean value information LA and gradient range exponent LD of each block are changed, it is possible to change the quality of the image formed by RGB image data obtained in the decoding process. For example, a gradation image can be obtained by increasing or reducing the value of the mean value information LA of each block in the main scan direction by a predetermined ratio.

When the reduction series copy mode is set in the aforesaid copying apparatus, the mean value information LA of each block is treated as image data of a reduction image 1/16 the size of the original document image, and a second encoding process is executed. The compressed data obtained by this encoding process is repeatedly written to compressed image memory 610 4 times in the main scan direction and 4 times in the subscan direction. If an image formation process is executed based on the data repeatedly written in the main scan direction and subscan direction in compressed image memory 610, compressed images 1/16 the size of the original document image can be repeatedly printed 4 times in the main scan direction and 4 times in the subscan direction on a single copy sheet. The mean value information LA of each block obtained from the data written in compressed image memory 610 can be treated as image data of a reduced image 1/256 the size of the original document image.

That is, the value of the mean value information of each block written to compressed image memory 610 is extracted therefrom, and again encoded as image data of a reduction image, such that if the data are repeatedly output 4 times in the main scan direction and 4 times in the subscan direction, reduced images 1/256 the size of the original document image can be repeatedly printed 16 times in the main scan direction and 16 times in the subscan direction on a single copy sheet.

When the image quality monitor mode is set, the values of the mean value information LA and gradient range exponent LD of encoded data obtained by the aforesaid second encoding process and written to compressed image memory 610 are rewritten in compressed image units. After the data are rewritten, 16 mutually different reduced images can be printed on a single copy sheet by executing an image formation process based on the RGB image data obtained by executing the GBTC method decoding process. (Refer to FIG. 10).

(3-1-2-1) Reduction Series Copy Process

Figure 8:
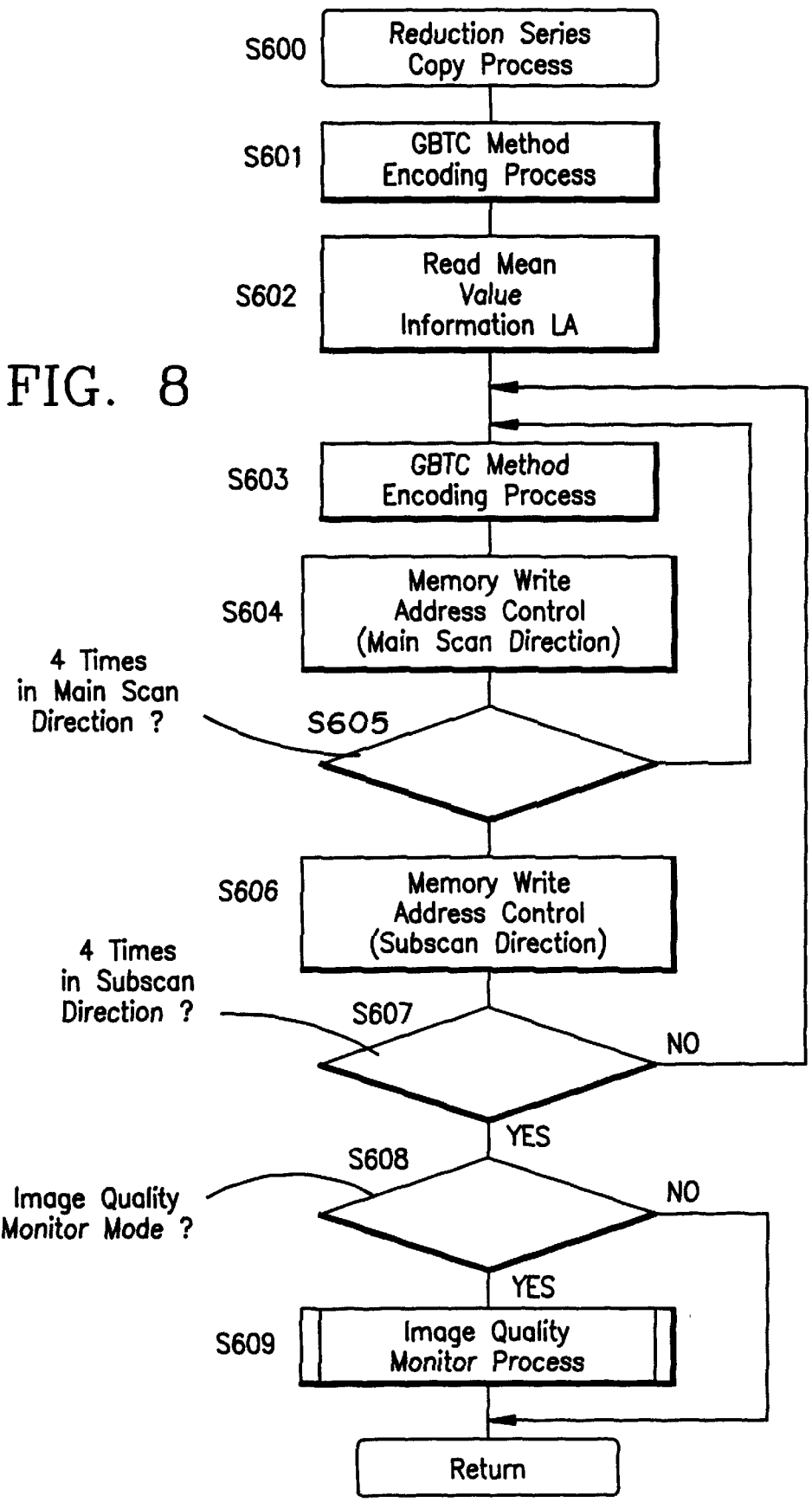
FIG. 8 is a flow chart of the reduction series copy process.

FIG. 8 is a flow chart of the reduction series copy process (step S600 in FIG. 6). First, the GBTC method encoding process is executed, and the encoded data (mean value information LA, gradient range exponent LD, code data øij) of each block are stored in compressed image memory 610 (step S601). The mean value information LA of each block is read from compressed image memory 610, and the read mean value information LA is stored in buffer memory 605 (step S602). The mean value information LA obtained for each block via the GBTC method encoding process is a value related to the mean value of the data of the 4×4 pixel image of each block. In the reduction series copy process, the value of the mean value information LA of each block read from buffer memory 605 is treated as the image data of a reduced image 1/16 the size of the original document image.

Figure 9A:
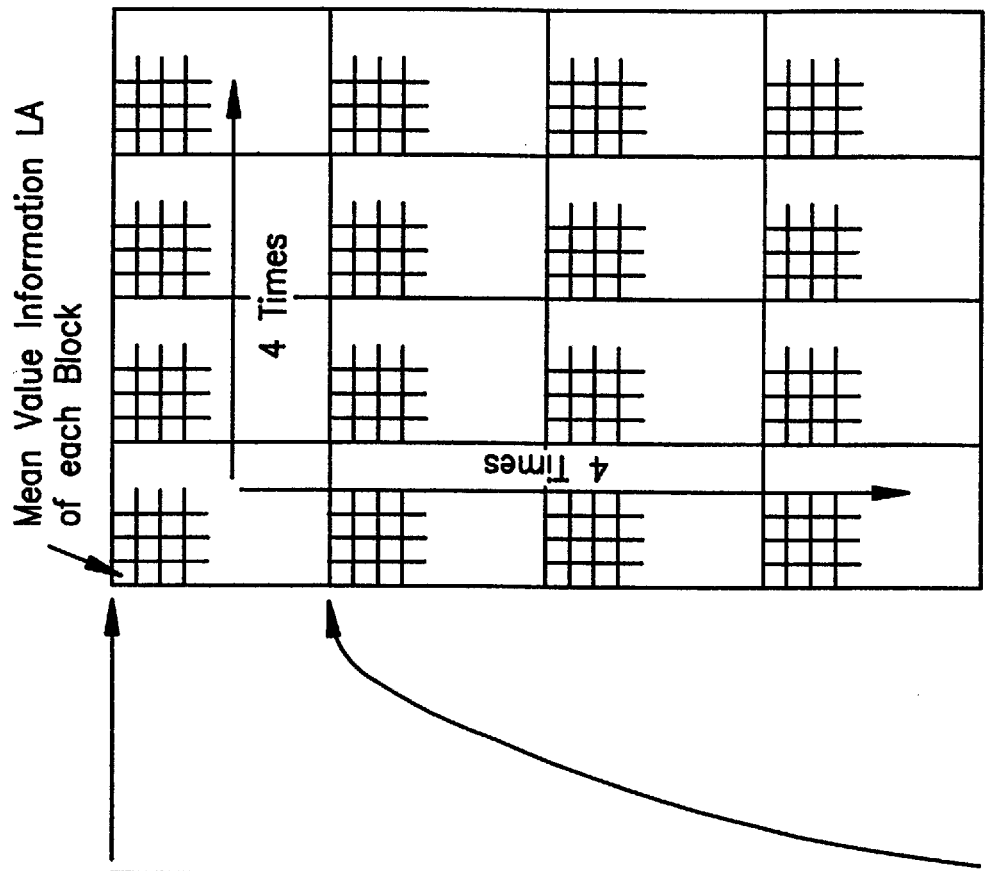
FIGS. 9(a) and 9(b) illustrate the relationship between the image data and the reduction image when reduction series copying is executed.
Figure 9B:
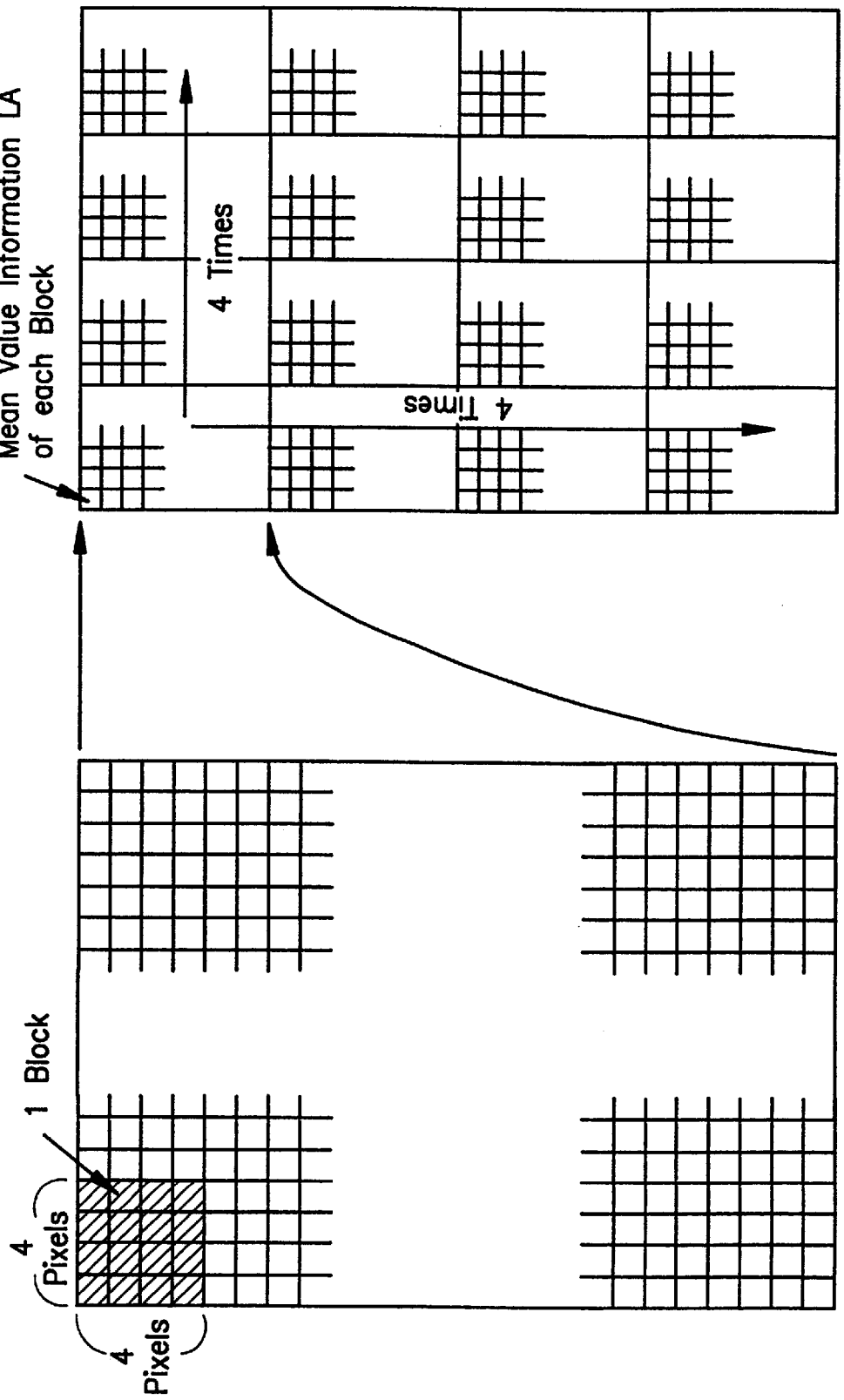

In steps S603 through S607, image data of the reduced image are repeatedly encoded, and the encoded data are written 4 times in the main scan direction and 4 times in the subscan direction of compressed image memory 610 to form a plurality of reduction images on a single copy sheet (refer to FIG. 9(b)). First, the mean value information LA read from buffer memory 605 is subjected to an encoding process as the pixel data of the reduced image (step S603). Memory write address control is executed, and the encoded data are written to compressed image memory 610 (step S604). The memory write address control is executed to expand the encoded image data in the main scan direction as shown in FIG. 9(b). When writing of the encoded data to compressed image memory 610 has not yet occurred 4 times in the main scan direction (step S605: NO), the routine returns to step S603 and the encoding process and writing of data to the compressed image memory 610 are repeated. When writing of the encoded data to compressed image memory 610 has occurred 4 times in the main scan direction as shown in FIG. 9(b) (step S605: YES), the write address of the compressed data is controlled so as to shift one frame in the subscan direction (step S606). When writing of the encoded data to compressed image memory 610 has not yet occurred 4 times in the subscan direction (step S607: NO), the routine returns to step S603.

When writing of the encoded data to compressed image memory 610 has occurred 4 times in the subscan direction (step S607: YES), a check is made to determine whether or not the image quality monitor mode is set based on the value of flag G (step S608). When the value of flag G is set at [1], it is determined that the image quality monitor mode is set (step S608: YES), and the image quality monitor mode process is executed (step S609). The image quality monitor mode process is described later. When the value of flag G is set at [0], it is determined that the image quality monitor mode is not set (step S608: NO), and the process ends and the routine returns.

(3-1-2-2) Image Quality Monitor Process

FIG. 10 is a conceptual drawing of the image quality monitor process. In the image quality monitor process, encoded data (mean value information LA, gradient range exponent LD, code data øij) obtained by the second encoding process using the GBTC method and stored in compressed image memory 610 are allocated 16 times as shown in FIG. 10. The values of the mean value information LA and gradient range exponent LD of each block within the allocation range are changed, and the changed values are written to compressed image memory 610. Thus, the image quality of the 16 reduced images formed on a single copy sheet can be individually changed.

Figure 11:
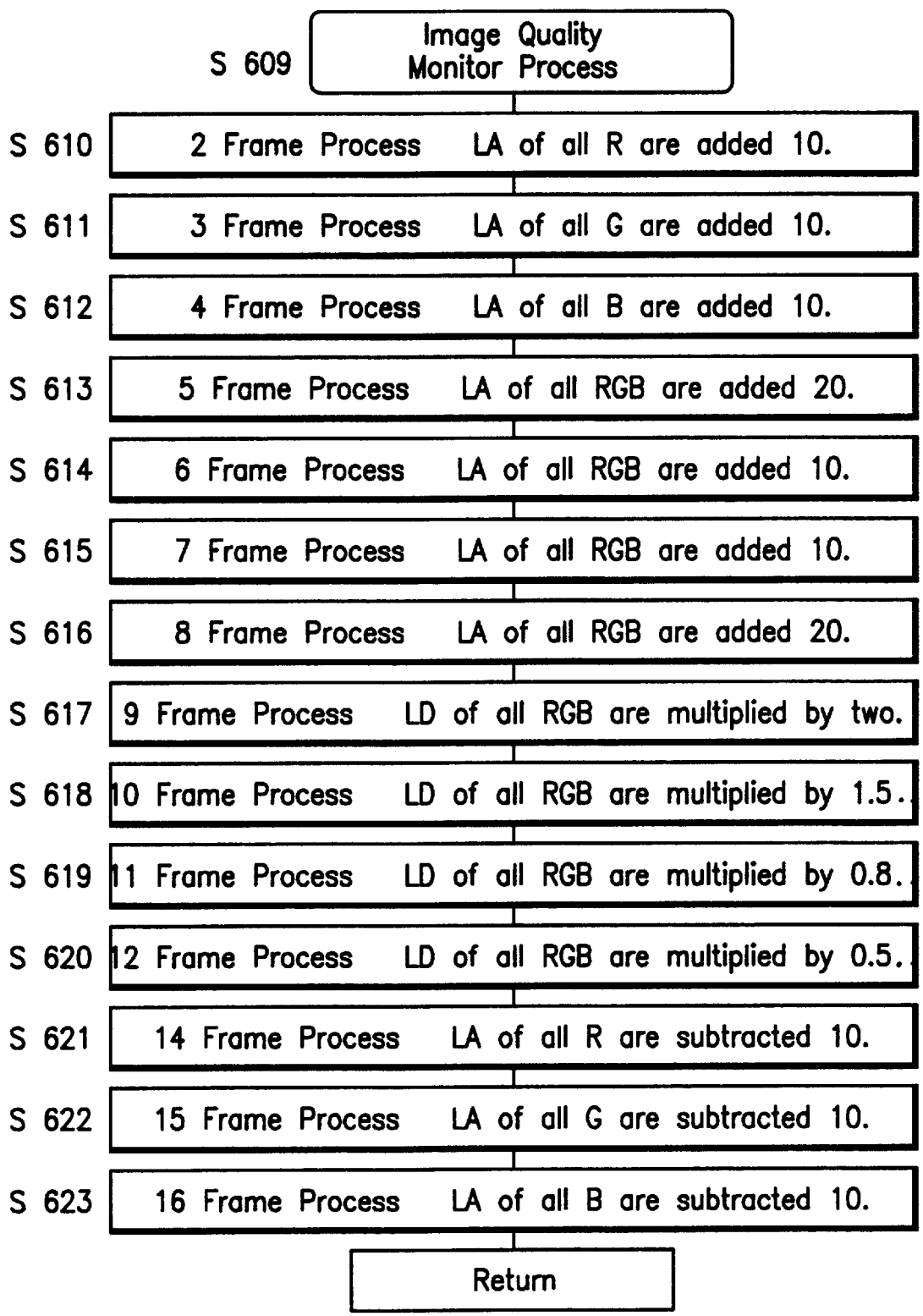
FIG. 11 is a flow chart of the image quality monitoring process.

FIG. 10 shows a single sheet divided into 16 areas, and the manipulation of the image data within the compressed image memory relative to the respective areas. To facilitate the following description, the first frame, second frame, and so on to the sixteenth frame are treated in sequence of the second encoding process. The manipulation of the contents of each frame is described below with reference to the flow chart of the image quality monitor process (step S609) of FIG. 11.

The reduced image of the first frame is designated the reference image. Accordingly, the code data relating to the reduced image of the first frame are not manipulated. To the value of the mean value information LA of all R-components in the code data of the reduced image of the second frame are added a value of 10, and this value is written to compressed image memory 610 (step S610). To the value of the mean value information LA of all G-components in the code data of the reduced image of the third frame are added a value of 10, and this value is written to compressed image memory 610 (step S611). To the value of the mean value information LA of all B-components in the code data of the reduced image of the fourth frame are added a value of 10, and this value is written to compressed image memory 610 (step S612). To the value of the mean value information LA of all RGB-components in the code data of the reduced image of the fifth frame are added a value of 20, and this value is written to compressed image memory 610 (step S613).

To the value of the mean value information LA of all RGB-components in the code data of the reduced image of the sixth frame are added a value of 10, and this value is written to compressed image memory 610 (step S614). From the value of the mean value information LA of all RGB-components in the code data of the reduced image of the seventh frame are subtracted a value of 10, and this value is written to compressed image memory 610 (step S615). From the value of the mean value information LA of all RGB-components in the code data of the reduced image of the eighth frame are subtracted a value of 20, and this value is written to compressed image memory 610 (step S616). The value of the gradient range exponent LD of all RGB-components in the code data of the reduced image of the ninth frame are multiplied by two, and this value is written to compressed image memory 610 (step S617). The value of the gradient range exponent LD of all RGB-components in the code data of the reduced image of the tenth frame are multiplied by 1.5, and this value is written to compressed image memory 610 (step S618).

The value of the gradient range exponent LD of all RGB-components in the code data of the reduced image of the eleventh frame are multiplied by 0.8, and this value is written to compressed image memory 610 (step S619). The value of the gradient range exponent LD of all RGB-components in the code data of the reduced image of the twelfth frame are multiplied by 0.5, and this value is written to compressed image memory 610 (step S620). The reduced image of the thirteenth frame is set as a reference image. Accordingly, the code data relating to the reduced image of the thirteenth frame cannot be manipulated. Then, from the value of the mean value information LA of all R-components in the code data of the reduced image of the fourteenth frame are subtracted a value of 10, and this value is written to compressed image memory 610 (step S621). From the value of the mean value information LA of all G-components in the code data of the reduced image of the fifteenth frame are subtracted a value of 10, and this value is written to compressed image memory 610 (step S622). From the value of the mean value information LA of all B-components in the code data of the reduced image of the sixteenth frame are subtracted a value of 10, and this value is written to compressed image memory 610 (step S623).

Thus, image data of sixteen individual reduced images having different image qualities can be obtained by executing the GBTC method decoding process for the code data written to compressed image memory 610 by the aforesaid process. An operator may review the sixteen images and select the image having the best image quality. After that selection, a final image is formed using the adjustments relating to the selected one of the sixteen images.

In the embodiment described above, the mean value information LA of each block obtained by subjecting the RGB image data to the GBTC method encoding process is treated as pixel data of the reduced image 1/16 the size of the original document. Then, the reduced image data comprising the value of the mean value information LA is subjected to a second GBTC method encoding process. As previously described, the value of the mean value information LA of each block obtained by the second GBTC method encoding process can be treated as data of a reduced image 1/256 the size of the original document image. Thus, image data of a reduced image 1/16n the size of the original document image can be obtained by using the value of the mean value information LA of each block obtained by subjecting the RGB image data to the GBTC method encoding process as the pixel data of the reduced image, and executing the GBTC method encoding process n times. Therefore, it is unnecessary to provide a separate processing unit for reduced series copying.

Accordingly, the image forming apparatus of the present invention treats the mean value information of each block obtained by encoding the image data in an encoding process unit as image data comprising each pixel of a reduced image of an original document image. The image forming means forms images on paper based on image data of a plurality of reduced images formed in the series copy data generating unit. Therefore, reduced images of a plurality of documents can be formed on a single sheet by a single image forming process without executing complex processes relative to image data before encoding or after decoding, thereby realizing the so-called reduction series copy function.

The image forming apparatus of the present invention provides that the control unit outputs data generated by the data generating unit to the encode process unit, subjects the data to the second encoding process. The second encoding process is like the original encoding process described above. The image data is divided into a plurality of blocks of pixels, and new mean value information, new gradient range exponents, and new pixel data are generated for each block. The new data is then stored in a memory unit. Thus, memory capacity can be reduced because storing image data of a plurality of reduced images is unnecessary.

The image forming means forms a plurality of reduced images on a sheet based on the image data obtained by a decoding process. Therefore, reduced images of a plurality of documents can be formed on a single sheet by a single image forming process without executing complex processes relative to image data before encoding or after decoding, thereby realizing the so-called reduction series copy function.

Furthermore, by providing a color balance changing means, the values of the mean value information and gradient range exponent of each block obtained by a second encoding process and stored in a memory unit can be rewritten to predetermined values for each block related to each reduced image. Therefore, reduced images of documents having different image qualities can be formed on a single sheet by a single image forming process without executing complex processes relative to image data before encoding or after decoding, thereby realizing the so-called image quality monitoring function.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image forming apparatus, comprising:
   an encode process unit for:
   (a) allocating image data of an original document into blocks containing a predetermined pixel matrix, and
   (b) determining from the image data in each block a weighted mean value information and a gradient range exponent for each block;
   a data generating unit for generating reduction image data for a plurality of reduction images by using the weighted mean value information for each of the blocks as image data for the reduction images so that each pixel of the reduction images corresponds to a respective one of the plurality of blocks of the original document image data; and
   image forming means for forming images based on the reduction image data generated by the data generating unit.

2. The image forming apparatus of claim 1, wherein the original document image data is eight bits per pixel capable of representing 256 halftone levels.

3. The image forming apparatus of claim 2, wherein the reduction image data includes two bits per pixel representing four halftone levels.

4. The image forming apparatus of claim 3, wherein the predetermined pixel matrix includes sixteen pixels.

5. The image forming apparatus of claim 4, wherein the reduction image data is six bytes per block, which includes weighted mean value information of eight bits, a gradient range exponent of eight bits, and thirty two bits representing pixel density information.

6. The image forming apparatus of claim 1, wherein the encode process unit further quantizes data of each pixel within each block as a gradient level based on the weighted mean value information and the gradient range exponent for the respective block.

7. The image forming apparatus of claim 6, wherein the quantized data defines the image with respect to fewer gradation levels than the original document image data.

8. The image forming apparatus of claim 1, wherein the encode process unit processes the original document image data using a generalized block truncation coding method.

9. The image forming apparatus of claim 1, wherein the weighted mean value information is mean value information that is weighted by minimum image data and maximum image data in each respective block.

10. An image forming apparatus, comprising:
    a calculation unit for allocating image data of an original document into a plurality of blocks containing a predetermined pixel matrix, and calculating from the image data in each of the blocks a weighted mean value information and a gradient range exponent for each of the blocks;
    an encode process unit for quantizing data of each pixel as a gradient level based on the weighted mean value information and the gradient range exponent for the respective block containing the pixel;
    a memory unit for storing the weighted mean value information for each of the blocks;
    a data generating unit for reading the weighted mean value information for each of the blocks from the memory unit and for generating reduction image data for a plurality of reduction images by using the weighted mean value information for each of the blocks as image data for the reduction images so that each pixel of the reduction images corresponds to a respective one of the plurality of blocks of the original document image data; and an image forming means for forming an image on a paper sheet based on the reduction image data.

11. The image forming apparatus of claim 10, wherein the quantized data defines the image with respect to fewer gradation levels than the original document image data.

12. The image forming apparatus of claim 10, wherein the original document image data is eight bits per pixel capable of representing 256 halftone levels.

13. The image forming apparatus of claim 12, wherein the reduction image data includes two bits per pixel representing four halftone levels.

14. The image forming apparatus of claim 13, wherein the predetermined pixel matrix includes sixteen pixels.

15. The image forming apparatus of claim 14, wherein the reduction image data is six bytes per block, which includes weighted mean value information of eight bits, a gradient range exponent of eight bits, and thirty two bits representing pixel density information.

16. The image forming apparatus of claim 10, wherein the weighted mean value information is mean value information that is weighted by minimum image data and maximum image data in each respective block.

17. An image forming apparatus, comprising:

a calculation unit for allocating image data of an original document into a plurality of blocks containing a predetermined pixel matrix, and calculating from the image data in each of the blocks a mean value information and a gradient range exponent for each of the blocks;

an encode process unit for quantizing data of each pixel as a gradient level based on the mean value information and the gradient range exponent for the respective block containing the pixel;

a memory unit for storing the mean value information for each of the blocks;

a data generating unit for reading the mean value information for each of the blocks from the memory unit and for generating reduction image data for a plurality of reduction images by using the mean value information for each of the blocks as image data for the reduction images so that each pixel of the reduction images corresponds to a respective one of the plurality of blocks of the original document image data;

an image forming means for forming an image on a paper sheet based on the reduction image data;

a control unit for outputting the reduction image data to the calculation unit for allocating the reduction image data into a plurality of blocks containing a predetermined pixel matrix, and calculating from the image data in each of the blocks a new mean value information and a new gradient range exponent for each of the blocks, the control unit further outputs the reduction image data generated by the data generating unit to the encode process unit for executing a second quantizing process on the reduction image data and storing the encoded image data in the memory unit; and a decode process unit for decoding the encoded image data based on the new mean value information and the new gradient range exponent for each block.

18. The image forming apparatus of claim 17, further comprising color balance changing means for adjusting the new mean value information and the new gradient range exponent for each block of encoded image data and the decode process unit decodes the encoded image data based on the adjusted mean value information and the adjusted gradient range exponent.

19. The image forming apparatus of claim 18, wherein the color balance changing means duplicates an image a plurality of times and adjusts the new mean value information and the new gradient range exponent differently for a plurality of the duplicated images so that a preferred level of adjustment can be determined.

20. An image forming method, comprising the steps of:

allocating image data of an original document into blocks containing a predetermined pixel matrix;

determining from the image data in each block a weighted mean value information and a gradient range exponent for each block;

generating reduction image data for a plurality of reduction images using the weighted mean value information for each of the blocks as image data for the reduction images so that each pixel of the reduction images corresponds to a respective one of the plurality of blocks of the original document image data; and forming images based on the reduction image data generated by the series copy data generating unit.

21. The image forming method of claim 20, wherein the encode process unit further quantizes data of each pixel within each block as a gradient level based on the weighted mean value information and the gradient range exponent for the respective block.

22. The image forming method of claim 20, wherein the encode process unit processes the original document image data using a generalized block truncation coding method.

23. The image forming method of claim 20, wherein the original document image data is eight bits per pixel capable of representing 256 halftone levels and the reduction image data includes two bits per pixel representing four halftone levels.

24. The image forming method of claim 20, wherein the predetermined pixel matrix includes six pixels and the reduction image data is sixteen bytes per block, which includes weighted mean value information of eight bits, a gradient range exponent of eight bits, and thirty two bits representing pixel density information.

25. The image forming method of claim 20, wherein the weighted mean value information is mean value information that is weighted by minimum image data and maximum image data in each respective block.

26. An image forming method, comprising the steps of:

allocating image data of an original document into blocks containing a predetermined pixel matrix;

determining from the image data in each block a mean value information and a gradient range exponent for each block;

generating reduction image data for a plurality of reduction images using the mean value information for each of the blocks as image data for the reduction images so that each pixel of the reduction images corresponds to a respective one of the plurality of blocks of the original document image data;

forming images based on the reduction image data generated by the series copy data generating unit;

wherein the encode process unit further quantizes data of each pixel within each block as a gradient level based on the mean value information and the gradient range exponent for the respective block;

allocating the reduction image data into a plurality of blocks containing a predetermined pixel matrix, and calculating from the reduction image data in each of the blocks a new mean value information and a new gradient range exponent for each of the blocks;

executing a second quantizing process on the reduction image data and storing the encoded image data in the memory unit; and decoding the encoded image data based on the new mean value information and the new gradient range exponent for each block.

27. The image forming method of claim 26, further comprising the steps of changing a color balance by generating an image a plurality of times using the encoded image data and the new mean value information and the new gradient range exponent and adjusting the new mean value information and the new gradient range exponent differently for most of the plurality of the images and selecting a desired adjustment from among the plurality of images.

28. An image forming method comprising the steps of:

allocating original image data of an original image into blocks containing a predetermined pixel matrix;

calculating a first weighted average value P1 for each of the blocks, wherein the first weighted average value P1 is weighted in favor of a lowest density level Lmax in the respective block;

calculating a second weighted average value P2 for each of the blocks, wherein the second weighted average value P2 is weighted in favor of a highest density level Lmin in the respective block;

calculating an average value Q1 for each of the blocks, wherein Q1 is an average of the density values of all pixels in a respective block having a density value less than P1;

calculating an average value Q4 for each of the blocks, wherein Q4 is an average of the density values of all pixels in a respective block having a density values greater than P2;

calculating a block average value LA for each of the blocks, wherein LA is an average of Q1 and Q4 for each respective blocks;

generating first reduction image data for generating a first reduction image, wherein each of the blocks is represented only by the block average value LA calculated for the respective block; and forming the first reduction image using the first reduction image data.

29. The method of claim 28, wherein P2 equals (3 Lmax+Lmin)/4, and P1 equals (Lmax+3 Lmin)/4.

30. The method of claim 28, wherein each pixel in the reduction image corresponds to a block in the original image and a density of each of the pixels in the reduction image is set to the block average value LA of the corresponding block in the original image.

31. The method of claim 29, wherein each pixel in the reduction image corresponds to a block in the original image and a density of each of the pixels in the reduction image is set to the block average value LA of the corresponding block in the original image.

32. The method of claim 28, further comprising the steps of:

calculating a gradient range for each of the blocks, wherein the gradient range corresponds to a difference between the highest density level and the lowest density level for each block;

generating generalized block truncation coding image data using the calculated block average value LA and the gradient range for each of the blocks; and forming an image using the generalized block truncation coding image data.

33. The method of claim 32, further comprising generating second generation reduction data by performing a generalized block truncation coding on the generalized block truncation coding image data.

34. The method of claim 32, wherein the gradient range equals Q4–Q1.

35. The method of claim 29, further comprising the steps of:

calculating a gradient range for each of the blocks, wherein the gradient range corresponds to a difference between the highest density level and the lowest density level for each block;

generating generalized block truncation coding image data using the calculated block average value LA and the gradient range for each of the blocks; and forming an image using the generalized block truncation coding image data.

36. The method of claim 35, wherein the gradient range equals Q4–Q1.

* * * * *